United States Patent [19]
Zettner

[11] Patent Number: 5,339,779
[45] Date of Patent: Aug. 23, 1994

[54] PISTON CONNECTION FOR A RECIPROCATING PISTON ENGINE

[76] Inventor: Michael L. Zettner, Neufriedenheim 9, D-8830 Treuchtlingen, Fed. Rep. of Germany

[21] Appl. No.: 64,112
[22] PCT Filed: Oct. 16, 1991
[86] PCT No.: PCT/EP91/01964
§ 371 Date: May 20, 1993
§ 102(e) Date: May 20, 1993
[87] PCT Pub. No.: WO/92/08043
PCT Pub. Date: Mar. 14, 1992

[30] Foreign Application Priority Data
Oct. 26, 1990 [DE] Fed. Rep. of Germany ....... 4034162

[51] Int. Cl.$^5$ ............................................ F02B 75/32
[52] U.S. Cl. .................................. 123/197.4; 123/52.6
[58] Field of Search .......... 123/52 A, 53 AA, 53 BA, 123/53 C, 197.3, 197.4

*Primary Examiner*—Noah P. Kamen
*Attorney, Agent, or Firm*—Sughrue, Mion, Zinn, Macpeak and Seas

[57] ABSTRACT

A piston suspension for a reciprocating piston engine, especially a prime motor or pump with one or two pistons per cylinder, has for each piston at least three force transmissions, which each consist of connecting rod or thombus and of a crank, wherein the axes of the crankshafts are not congruent.

5 Claims, 3 Drawing Sheets

PISTON CONNECTION FOR A RECIPROCATING PISTON ENGINE

BACKGROUND OF THE INVENTION

The present invention relates to a piston suspension for a reciprocating piston engine and to an engine incorporating the suspension.

The tilt play of a piston in a reciprocating piston engine, for example in a four-stroke reciprocating piston engine, has been known and researched for a long time. In this connection see, for example, Carl Riedel "Konstruktion und Berechnung moderner Automobile- und Kraftradmotoren", 2nd Edition, Berlin 1931, page 141, FIG. 144.

In order to balance out the forces which arise at the reciprocating piston due to the tilt play, constructional measures are necessary apart from the use of lubricant. In the case of a four-stroke reciprocating piston engine the piston moves not only upwardly and downwardly, but also laterally in the connecting rod plane. During this motion, the piston changes cylinder side, against which it presses, six times per working cycle, i.e. in two revolutions. The thus arising friction causes about 50 to 75% of the mechanical friction loss. In order to alleviate the resulting forces and the effect thereof on material, laterally offset shafts, among other things, are used in engine construction. The crankshaft does not lie exactly centrally under the piston, but is slightly laterally displaced.

Equally, it is usual to offset the piston gudgeon pins (DE-OS 2 751 932) so that the impacts when cylinder side exchange occurs are softer and the piston has a rolling action relative to the cylinder wall. By this means, the lateral forces of the piston can be alleviated. However, the remaining lateral forces must be picked up by a lubricant film to prevent the piston from scuffing the cylinder wall.

A further known measure which alleviates the lateral forces of the piston is a piston suspension by means of a crosshead, as employed in, in particular, double-acting steam engines.

Also known are constructions in which the pistons are suspended at guided rods which run in linear bearings and terminate at one end in a crosshead. These have been used for, in particular, locomotives.

In the aforementioned constructions a lubricant is present in the working chamber for the piston or in the spaces adjoining the working chamber.

All the above-described constructions in practice function only with lubricant.

A construction which has become known under the name Philips rhombic gear by R. J. MEIJER (DE-AS 1 080 351) hardly needs a lubricant in the working chamber for the piston. In order to alleviate the substantially higher friction of the rhombic gear caused by the gearwheels, the gearwheels are lubricated or greased. For the case where use requires a lubricant-free working chamber, the piston has to seal off the crankcase relative to the working chamber.

The same is also true for the connecting rod arrangement according to FICHT with crank guide (DE-OS 3 433 510). Due to the transmission by means of a connecting rod movable in only one point, the Philips rhombic gear piston suspension and the piston suspension of Ficht have only small tilt play of the piston, Excepting the piston mounting by means of linearly guided piston rods at both piston sides, all known piston suspensions have a tilt play of the piston, caused by the movable connecting means connected at one rotational point. The piston has play relative to the cylinder wall and is able to move on the cylinder wall. This movement is mostly a rotary movement which emanates from the rotational mounting of the force-receiving component at the piston suspension. In the example with the rhombic gear, the tilt play is restricted to play in the toothing of the gearwheels, this play being multiplied by the lever effect from the point of engagement of the gearwheels up to the wedge point at the piston.

In the example with piston rods at both sides of the piston this play is restricted to the bearing play of the piston rods. However, this piston rod bearing is difficult to properly seal off from the working chamber and exhibits high friction losses.

In the case of all the aforedescribed constructions a lubrication of the piston or the piston rods is required in order to avoid scuffing.

A dry slide bearing instead of a lubricant, for example, a polyimide bearing of the kind available under the name "Vespel" from Dupont in France, has not proved itself in practice. The tilt play leads to higher wear rates, so that sealing leakages arise after a certain time.

Up to now there is thus no long-life reciprocating piston engine, operating as a motor, which can manage without lubricant In the case of dry running reciprocating piston pumps the problems are similar, the substantially lower pressures being less conducive to wear than the pressure peaks in motors.

SUMMARY OF THE INVENTION

The invention therefore has as its principal object the provision of a piston suspension for a reciprocating piston engine operable as, for example, a prime motor or pump and in which the play between piston and cylinder can be so small that lubricant between piston and cylinder may not be necessary, the friction of dry sealing rings may be reduced and sealing off of the piston housing or piston guide rods may be redundant.

According to the present invention there is provided a piston suspension for a reciprocating piston engine, especially a prime mover or pump, with one or two pistons per cylinder and with, for each piston, two force transmission systems each comprising connecting means and a crank, wherein for each piston there is further provided at least a third force transmission system comprising connecting means and a crank, and wherein the axis of the additional crank is not congruent with the axes of the cranks for the first and second force transmission systems.

In a development of the invention the suspension comprises a discoid piston mounting ring to which the connecting means of the transmission systems are connected.

In a further development of the invention the piston mounting ring is provided with a circular cutout, which corresponds to the piston shape, and the diameter of which is greater than the diameter of the piston by a small amount so that the piston is mountable and demountable through the ring.

For preference, the piston suspension comprises three connecting rods, approximately forming a tripod, with crankshafts.

DETAILED DESCRIPTION OF THE PREFERRED EMBODIMENTS

Figure 1:
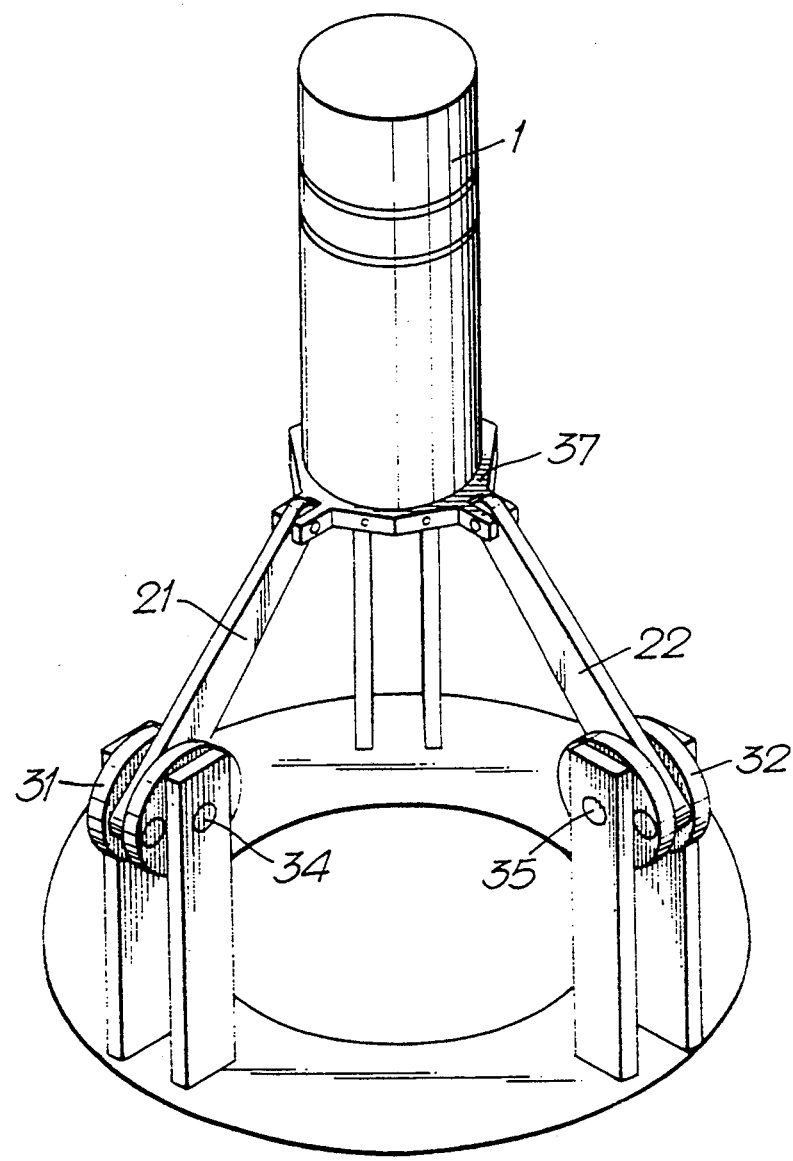
FIG. 1 is a perspective view of a reciprocating piston carried by three connecting rods and crankshafts of a first piston suspension embodying the invention.
Figure 2:
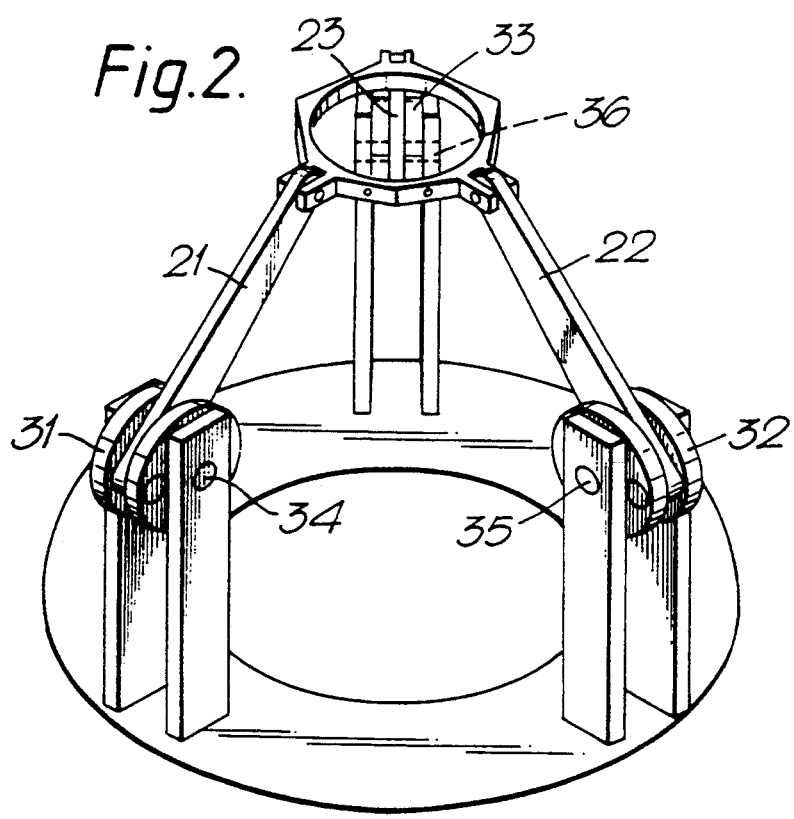
FIG. 2 is a perspective view of the suspension of FIG. 1, with the piston omitted.

In the first embodiment according to FIGS. 1 and 2, there is illustrated a suspension for a piston 1 of a reciprocating piston engine, wherein the piston 1 is connected to three connecting rods 21, 22 and 23 by way of a mounting ring 37. The connecting rods 21, 22 and 23 in this case are of equal length and are connected to three cranks 32, 32 and 33, respectively. Crankshafts 34, 35 and 36 do not lie on a straight line and also need not be interconnected, for example as in the case of a rhombic gear. Thus the piston 1 is mounted almost free of play, with respect to the friction between piston 1 and the cylinder wall, at all points of upward and downward movement. The play is limited to the bearing tolerances. The crankshafts 34, 35 and 36 need not be disposed in alignment or parallel to one another. Also, the offset of the three cranks 31, 32 and 33 can be different.

Figure 1A:
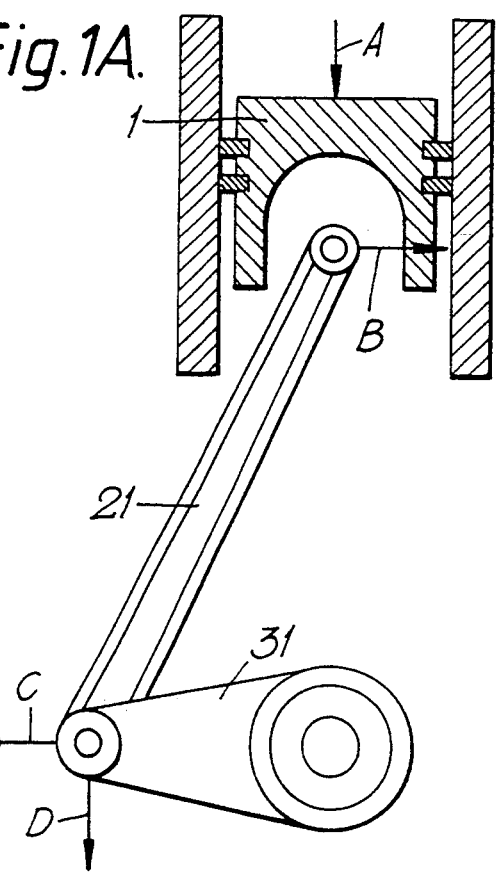
FIG. 1A is a view of a piston which is carried by a suspension (not embodying the invention) consisting of only one connecting rod, with illustrated associated force vectors.

As is illustrated in FIG. 1A, which shows a conventional piston suspension with a single connecting rod 21 and crank 31, the component D of the force A acting on the piston 1 during downward movement thereof is transferred by the connecting rod 21 to the crank 31. Arising at the piston 1 is a counterforce B to a force component C, which acts on the crank 31 and is perpendicular to the direction of movement of the piston 1. The counterforce B deflects the piston 1 similarly perpendicularly to its movement direction, but in an opposite sense. The forces are depicted in FIG. 1A. This counterforce B causes the wear in the case of conventional piston suspensions. In the case of the present invention, this force is checked by counterforces of the two connecting rods 32 and 33 and completely balanced out. The forces which are directed laterally and perpendicularly relative to the direction of movement of the piston 1 do not act on the piston 1, but are transferred to the crankshafts 34, 35 and 36 and no longer represent a source of wear between piston 1 and the cylinder. Counteracting the disadvantageous greater complexity of three crankshafts compared to the former one crankshaft is the advantage that the offset of the cranks can be kept smaller than the stroke. Also, the individual crankshafts are more lightly loaded, which leads to simplification of the crankshafts and their mounting.

Illustrated in FIG. 2 is the piston suspension according to FIG. 1, but with piston 1 demounted. It is evident from this that the piston 1 is surrounded at its lower end by the mounting ring 37 and clamped in. If the mounting ring 37 is opened, the piston can then be drawn downwardly through the ring 37 and exchanged.

Figure 3:
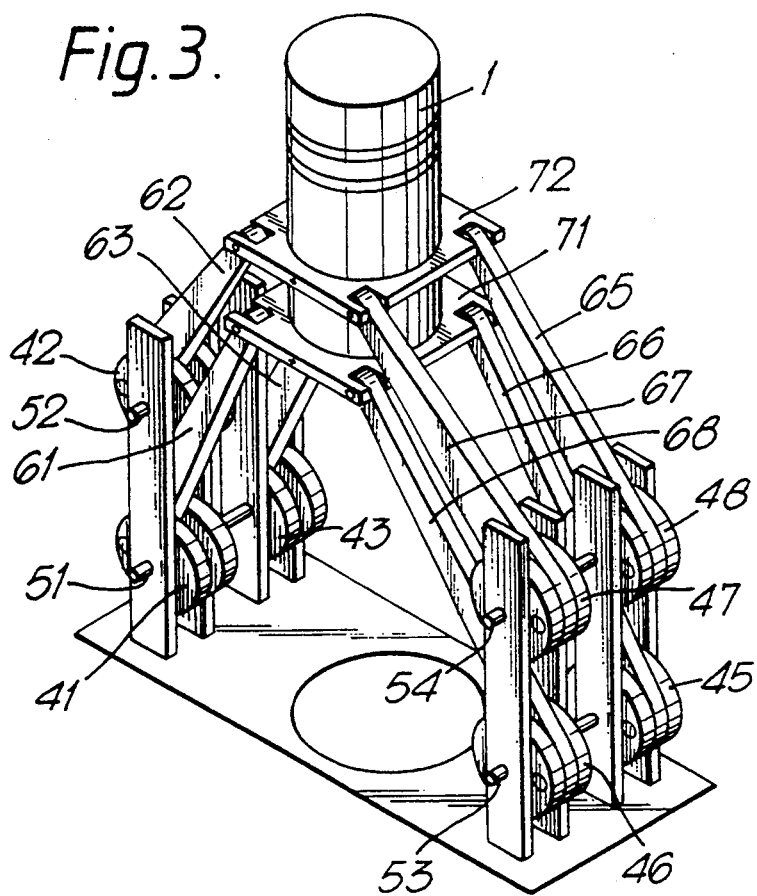
FIG. 3 is a perspective view of a reciprocating piston carried by eight connecting rods and four crankshafts of a second piston suspension embodying the invention.
Figure 4:
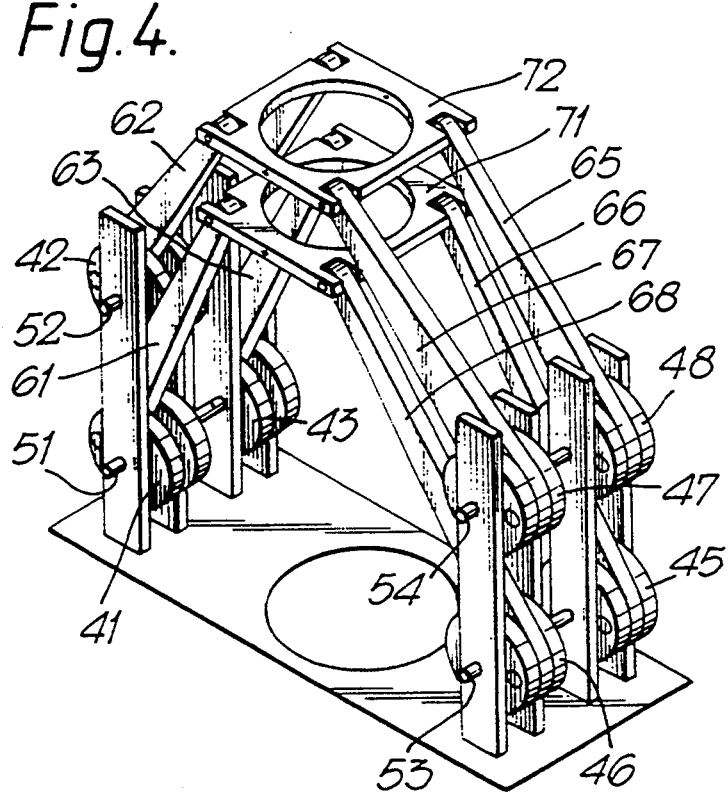
FIG. 4 is a perspective view of the suspension of FIG. 3, with the piston omitted.

For reasons of simpler engine construction, crankshafts extending parallel to one another are preferred, and FIGS. 3 and 4 illustrate a piston suspension with four crankshafts 51, 52, 53 and 54 and four divided connecting rods 61 to 68. In this embodiment the four crankshafts 51, 52, 53 and 54 are parallel. The offset of the eight cranks 41 to 48 is approximately one third of the stroke. The divided connecting rods 61 to 68 are attached to two mounting rings 71 and 72, respectively disposed in two planes, at points spaced from the piston 1 in order to achieve additional stability.

The crankshafts 51, 52, 53 and 54 can be dimensioned to be smaller due to the lateral displacement relative to the piston center line and due to the force distribution. By means of the lateral displacement of the crankshafts 51, 52, 53 and 54 the offset of the cranks 41 to 48 is also smaller. The crankshafts 51, 52, 53 and 54 arranged laterally relative to the piston center line lead to a more favorable application of the forces to the crankshafts. As opposed to a conventional reciprocating piston engine where a connecting rod acts mostly radially on the crankshaft at the top and bottom dead center of the piston, this action is particularly favorable, in the case of the present invention, according to the respective magnitude of the deflection. The tangential forces significantly outweigh the radially acting forces on the crankshaft. The force distribution and the lateral displacement of the crankshafts cause a tangential application of the forces to the crankshafts by the connecting rods instead of a radial application. For this reason the connecting rod bearings and the crankshaft bearings can be roller bearings. If, for example, sealed roller bearings are selected, then lubrication of the crankshaft complex is no longer necessary. A reciprocating piston engine constructed in that manner may therefore be able to manage without pressure lubrication.

Due to the relatively play-free mounting of the piston 1, seals can now be used which run in a dry state and which, after a certain bedding-in period, undergo no further wear which might otherwise lead to engine breakdowns or to sealing tolerances.

A further advantage of this kind of piston suspension resides in the possibility of being able to install and demount the piston 1 through the base of the crankshaft housing and past the crankshafts. In order to make this possible, the piston 1 may be divided. One part of the piston 1, to which the connecting rods 61 to 68 are attached, thus represents part of the suspension of the actual piston.

The piston suspension according to FIG. 3 is shown in FIG. 4 with the piston demounted. In this embodiment the piston 1 is surrounded and clamped at its lower end by the two mounting rings 71 and 72 disposed in two planes, this arrangement providing a particularly secure tilt-free mounting. If the mounting rings 71 and 72 are opened, then in this embodiment, too, the piston 1 can be drawn downwardly through the mounting rings 71 and 72 and exchanged. The arrangement of the connecting rods according to FIGS. 3 and 4, or according to FIGS. 1 and 2, enables the piston 1 to be removed from the motor or the pump and refitted in a very short time. Thus the exchange of piston sealing rings is a simple matter, as the piston is withdrawable as a unit without problems.

The piston can be secured to the mounting ring 37 or mounting rings 71 and 72 or to another part of the piston suspension by means of threading, bayonet coupling, screws or other suitable methods.

It is also possible to mount several pistons on one crankshaft, for example in the case of two oppositely running or staggered pistons in one cylinder. Equally, the number of connecting rods can be increased as desired

I claim:

1. A piston suspension for a reciprocating piston engine, the suspension comprising: at least three force transmission systems for a same piston held by the suspension, wherein each transmission system comprises a crank and connecting means for providing a drive connection between the crank and the piston, and wherein a rotational axis of the crank of a third one of said transmission systems is not congruent with rotational axes of the cranks of either first or second ones of said transmission systems.

2. A piston suspension as claimed in claim 1, further comprising at least one mounting ring for mounting the piston, the connecting means of the transmission systems being connected to the mounting ring.

3. A piston suspension as claimed in claim 2, wherein the mounting ring has an opening substantially corresponding in outline shape to a circumferential shape of the piston, and is adapted to retain the piston in the opening, a diameter of the opening in the mounting ring being adjustable to be greater than a diameter of the piston to permit movement of the piston through the opening.

4. A piston suspension as claimed in claim 1, wherein the connecting means of said at least three transmission systems comprise connecting rods which are spaced apart from each other and which extend divergently from each other in directions away from the piston.

5. Piston suspension according to claim 4, characterised by three connecting rods (21, 22, 23), approximately forming a tripod, with crankshafts (31, 32, 33).

* * * * *